UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

ELECTROLYTE FOR ALKALINE STORAGE BATTERIES.

No. 876,445.          Specification of Letters Patent.          Patented Jan. 14, 1908.

Application filed May 10, 1907. Serial No. 372,919.

*To all whom it may concern:*

Be it known that I, THOMAS A. EDISON, a citizen of the United States, and a resident of Llewellyn Park, Orange, in the county of Essex and State of New Jersey, have invented certain new and useful Improvements in Electrolytes for Alkaline Storage Batteries, of which the following is a description.

In the experimental and commercial development of alkaline storage batteries of the Edison type, the difficulties which have been encountered have been confined very largely to the depolarizing electrode in connection with which nickel hydroxid is used. The storage capacity of the nickel element has been less than that of the iron element, and the capacity of the nickel element cannot be maintained for so long a period of time as the iron element. Furthermore, the nickel hydroxid as an active material, is seriously affected by any iron from the other electrode that may be dissolved in the electrolyte, as well as by impurities which in small traces are inevitably present in chemical materials when used commercially.

My invention is based on the discovery that the capacity of the nickel hydroxid can be materially increased, while at the same time the capacity will be maintained for longer periods, by adding to the alkaline electrolyte a small proportion of lithium hydroxid. The electrolyte may be a solution of sodium or potassium hydrate. The preferred amount of lithium hydroxid employed is about 2% by weight, or in other words for each 100 c. c. of the solution, the amount of lithium hydroxid used will be preferably about 2 grams, but the proportion may be varied more or less on either side of this quantity. The preferable solution when sodium hydrate is used is about 15% and when potassium hydrate is used, about 21%, or in other words each 100 c. c. of solution will preferably contain of sodium hydrate 15 grams or of potassium hydrate, 21 grams. The increase in capacity of an Edison cell in which lithium hydroxid is used, amounts to about ten per cent., while the increase of the time over which the capacity may be maintained is remarkable, and of the highest commercial importance. I am not able to explain why the addition of lithium hydroxid as explained, to the electrolyte, should result in such striking and noticeable phenomena.

Having now described my invention, what I claim as new therein, and desire to secure by Letters Patent, is as follows:

1. An alkaline electrolyte for storage batteries, employing lithium hydroxid, substantially as set forth.

2. An alkaline electrolyte for storage batteries, employing sodium or potassium hydrate, and containing about two per cent. of lithium hydroxid, substantially as set forth.

3. A storage battery employing as active materials compounds of nickel and iron, and an alkaline electrolyte employing sodium or potassium hydrate, and containing lithium hydroxid, substantially as set forth.

This specification signed and witnessed this 8th day of May 1907.

THOMAS A. EDISON.

Witnesses:
  FRANK L. DYER,
  FRANK D. LEWIS.